(12) United States Patent
Guldhov

(10) Patent No.: US 12,329,142 B2
(45) Date of Patent: Jun. 17, 2025

(54) HOOF SHOE AND METHOD FOR MANUFACTURING A HOOF SHOE

(71) Applicant: Guldhov International AB, Växjö (SE)

(72) Inventor: Mia Guldhov, Skene (SE)

(73) Assignee: Guldhov International AB, Skene (SE)

( * ) Notice: Subject to any disclaimer, the term of this patent is extended or adjusted under 35 U.S.C. 154(b) by 37 days.

(21) Appl. No.: 18/273,373

(22) PCT Filed: Feb. 21, 2022

(86) PCT No.: PCT/SE2022/050183
§ 371 (c)(1),
(2) Date: Jul. 20, 2023

(87) PCT Pub. No.: WO2022/177498
PCT Pub. Date: Aug. 25, 2022

(65) Prior Publication Data
US 2024/0081312 A1    Mar. 14, 2024

(30) Foreign Application Priority Data
Feb. 19, 2021 (SE) .................. 2150178-8

(51) Int. Cl.
*A01L 3/00* (2006.01)
*A01L 5/00* (2006.01)

(52) U.S. Cl.
CPC .. *A01L 3/00* (2013.01); *A01L 5/00* (2013.01)

(58) Field of Classification Search
CPC ..... A01L 3/00; A01L 3/02; A01L 5/00; A01L 11/00; A01L 13/00; A01L 9/00
See application file for complete search history.

(56) References Cited

U.S. PATENT DOCUMENTS 517,176 A    3/1894    Smith
549,536 A    11/1895   Roche
(Continued)

FOREIGN PATENT DOCUMENTS

CN    105638596    6/2016
WO    2017028957   2/2017

OTHER PUBLICATIONS

International Preliminary Report on Patentability issued in PCT/SE2022/050183, Aug. 22, 2023, pp. 1-12.
(Continued)

*Primary Examiner* — Joshua J Michener
*Assistant Examiner* — Henry Hooper Mudd
(74) *Attorney, Agent, or Firm* — Jeffrey S. Melcher; Melcher Patent Law PLLC

(57) ABSTRACT

The present invention relates to a hoof shoe (1) for hoofed animals, and a method for manufacturing a hoof shoe (1). The hoof shoe (1) comprises a bottom rim portion (10), two heel support portions (14, 16), each heel support portion (14, 16) extending from an outer side of a respective rear end of the bottom rim portion (10) and wherein the two heel portions (14, 16) are configured to contact a rear side of a hoof when the hoof shoe (1) is mounted to a hoof, and a front locking portion (12), the front locking portion (12) comprising: a first and second locking member (122, 126), a first and a second resilient member (120, 125), wherein the first and second locking members (122, 126) are configured to mate in a locked state around a hoof and contact a front side of the hoof with a contacting surface. The first and a second resilient member (120, 125) are fixedly attached to a first and second half portion, respectively, of the bottom rim portion (10) along a major portion of the horizontal extension of said first and second half portion.

11 Claims, 4 Drawing Sheets

(56) References Cited

U.S. PATENT DOCUMENTS

| | | | |
|---|---|---|---|
| 817,638 A | 4/1906 | Gibb | |
| 849,879 A | 4/1907 | Adelman | |
| 860,101 A | 7/1907 | McLachlan | |
| 1,090,116 A | 3/1914 | Dresser | |
| 1,176,504 A | 3/1916 | Wasylyszyn | |
| 1,288,546 A | 12/1918 | Ferrier | |
| 2,353,568 A * | 1/1942 | King | A01L 5/00 |
| 10,313,573 B2 | 6/2019 | Lee et al. | |
| 2010/0031614 A1 | 2/2010 | Osorne | |
| 2014/0262353 A1 | 9/2014 | Bergeleen | |
| 2016/0029609 A1* | 2/2016 | MacDonald | A01L 3/00 |
| 2017/0208791 A1* | 7/2017 | Eberle | A01L 3/00 |
| 2018/0042210 A1* | 2/2018 | Edwards | A01K 3/02 |
| 2019/0208746 A1* | 7/2019 | Forstner | A01K 13/00 |
| 2019/0364869 A1* | 12/2019 | Smith | A01L 11/00 |
| 2021/0219534 A1* | 7/2021 | Pereira Suarez | A01L 5/00 |
| 2023/0172161 A1* | 6/2023 | MacDonald | A01K 13/00 |

OTHER PUBLICATIONS

International Search Report and Written Opinion issued in PCT/SE2022/050183, May 5, 2022, pp. 1-19.

Research: 3D Printed Horseshoe and Hoof Scanning Trials Launched by Vet School Farriers at Utrecht University in The Netherlands [online]; The Hoof Blog, Jun. 12, 2019 [retrieved on Apr. 22, 2022]. Retrieved from: <https://hoofcare.blogspot.com/2019/06/research-3d-printed-horseshoe-hoof-utrecht-farrier.html>; whole document.

* cited by examiner

HOOF SHOE AND METHOD FOR MANUFACTURING A HOOF SHOE

TECHNICAL FIELD OF THE INVENTION

The present invention relates to a fitted hoof shoe and a method for manufacturing a fitted hoof shoe for use by a hoofed animal.

BACKGROUND

Hoof shoes, such as horseshoes, are used to reduce the wear of the hoofs of hoofed animals. The hoof shoes may further be provided with e.g. studs so as to provide the animal wearing the hoof shoes with a better grip when moving on the ground. Traditionally, horseshoes or similar are forged in metal and provided with apertures allowing the horseshoes to be nailed to an underside of the hoof to protect the hoof from the ground. To provide a horseshoe with a good fit the horseshoe is heated to make the metal flexible whereupon the horseshoe is bent into an appropriate shape and the horseshoe is cooled prior to being nailed into place on the hoof. A benefit of metal horseshoes is that the horseshoes are reliable and do not need to be replaced often.

A drawback of metal horseshoes is that the procedure of tailoring the horseshoes after the horse hoof is cumbersome and labor intensive. Further, nailing horseshoes to a hoof risk damaging the inner and outer structures of the horse hoof. On each occasion a nailed horseshoe is replaced the wear of the hoof increases.

To circumvent these shortcomings various hoof boots have been provided, e.g. as known from DE-103 13 573. Generally, hoof boots are made out of a flexible rubber material and provided in a variety of sizes with laces or a hook-and-loop member in a variety of sizes with laces or a hook-and-loop member allowing the boots to be easily placed around the hoof and tightened around the lower leg of the hoofed animal so as to stay in place. As opposed to conventional metal horseshoes the hoof boots are easy to remove and reattach. However, a downside is that they are not as reliable as conventional horseshoes made of metal and that it may be difficult to find a hoof boot which fits each hoof of a hoofed animal properly. Additionally, this kind of hoof boots may tightly engage soft tissue surrounding the hoof which could result in skin scrapes or cuts when a horse moves with the hoof boots. Further, from US-817 638, US-860 101, US-1 288 546 and U.S. Pat. No. 1,090,116 there are known a metallic kind of hoof shoes, which all were developed more than 100 years ago. As apparent, due to not being on the market, this metallic kind of hoof shoes does not provide a satisfactory solution.

Moreover, other types of horseshoes such as therapeutic horseshoes or foal horseshoes are fastened to the horse hoof using adhesives. Such horseshoes mitigate the risk of damaging the inner and outer structure of by the insertion of nails. However, removing and replacing a horseshoe fastened with adhesive is a cumbersome procedure as e.g. adhesive residues on the hoof must be removed in addition to the removal of the horseshoe itself.

SUMMARY OF THE INVENTION

Despite the conventional horseshoe and hoof boot solutions discussed in the above, there is a need for an improved hoof shoe and an improved method for manufacturing hoof shoes which overcomes at least some of shortcomings described in the above. It is an object of the present invention to provide such an improved hoof shoe and an improved method for manufacturing a hoof shoe. The invention is defined by the appended independent claims, with embodiments being set forth in the appended dependent claims, in the following description, and in the drawings.

According to a first aspect of the invention there is provided a fitted hoof shoe for hoofed animals, the hoof shoe comprising a bottom rim portion configured to, on an inner side thereof, contact a bottom side of a hoof, the bottom rim comprising a first and a second half portion joined at a common front end and partly enclosing a central mounting opening and two heel support portions, each heel support portion extending from an outer side of a respective rear end of the bottom rim portion and wherein the two heel portions are configured to contact a rear side of a hoof when the hoof shoe is mounted to a hoof. The fitted hoof shoe further comprising a front locking portion, the front locking portion comprising a first and second locking member, a first and a second resilient member, wherein the first locking member is attached to an outer side of the first half portion of the bottom rim via the first resilient member and the second locking member is attached to an outer side of the second half portion of the bottom rim via the second resilient member, and wherein the first and second locking members are configured to mate in a locked state around a hoof and the front locking portion is configured to contact a front side of the hoof with a contacting surface facing the inner side of the bottom rim, wherein a, substantially horizontally extending lower edge of each resilient member is fixedly attached adjacent the outer side edge of said first and half portion, respectively, along a major portion of the horizontal extension of said first and half portion, respectively, and wherein preferably each resilient member having a generally vertically extending front edge connecting with a front end of each of said lower edge of said resilient members at a position providing an open central toe opening.

The fitted hoof shoe may be mounted to a horse's hoof as a horseshoe or mounted to any other hoofed animal. The bottom rim portion may be the shape of a traditional horseshoe with the central opening being delimited by the bottom rim in a forward direction, a first side direction and a second side direction while the bottom rim is only partly delimiting the central opening in a backwards direction. Consequently, each half portion of the bottom rim has a respective rear end on an opposite side from the common front end. Each heel support portion extends upwards (in the direction of a normal of the inner side of the bottom rim) and is configured to contact a respective heel of the rear side of the hoof when the hoof shoe is mounted to a hoof. The two heel support portions are thus separated by a void space extending backwards from the central opening.

The front locking portion is configured to contact the front side of a hoof with a contacting surface facing the inner side (the central opening and/or the inner side of the bottom rim). The front locking portion may, in the locked state, form a band which is attached at a respective end at the first and second half portion of the bottom rim.

The invention is at least partly based on the understanding that by providing two separate heel support portions and a front locking portion the hoof shoe may be easily attached to a hoof and held reliantly in place by the heel support portions and the front locking portion without using specialized tools.

The front locking portion has a locked and unlocked state. In the unlocked state the first and second resilient members are not engaged via the first and second locking member which provides enough play for the hoof shoe to be easily installed onto a hoof. When the first and second locking members brought in engagement the front locking portion is tightened towards a frontside of the hoof and the heel support portions are tightened towards a backside of the hoof (e.g. a respective heel of the backside of the hoof) enabling the hoof shoe to reliantly stay in place. The resilient members may be realized by plastic members, e.g. polyamide.

An underside of the bottom rim may be provided with spikes, slots for fastening spikes or other gripping means which may facilitate the grip against the ground for the hoofed animal wearing the hoof shoe. Moreover, the underside and bottom rim portion may be adapted to receive a bottom hoof shoe (e.g. a conventional simple metal hoof shoe) by e.g. being provided with slots or being made of a porous material into which nail may be inserted to hold an additional bottom hoof shoe in place. In some implementations the inner side of the bottom rim and the contacting face of the front locking portion defines an inside of the hoof shoe, and wherein the inside facing side of the of the two separate heel support portions are concave so as to clasp a respective heel buttress of the hoof.

The two separate heel support portions may be concave so as to be configured to clasp a respective heel of the hoof. The two heel support portions may be concave such that a normal of the inner side of the respective heel support portions face away from each other. For example, a normal of the inner side of the respective heel support portions may face away from each other and form an angle between 0 degrees and 180 degrees, such as 30, 45, 90, or 120 degrees so as to facilitate reliantly holding the hoof shoe to a hoof. The respective heel support portion may curve around the respective end portion of the bottom rim such that a portion of a heel support portion forms an inner wall extending from an inner edge of the bottom rim (bordering the central opening). That is, in addition to the heel supporting portions forming a part of an outer wall extending from the outer limits of the bottom rim. The heel support portions may form an inner wall extending from the inner limits of the bottom rim and extending from a rear end of the bottom rim towards the common front end so as to clasp a heel of the hoof from the inside, outside and rear side of the heel.

Furthermore, the two concave heel support portions may have a respective curving radius in a plane of the bottom rim portion and wherein the curving radius of the two concave heel support portions are different. Accordingly, the hoof shoe may be fitted to a particular hoof of a particular hoofed animal. In general, the shape of the two hoof heels of a hoof are different and by providing differently shaped heel contacting portions the present hoof shoe provides better fit for all hooves and will be held more reliantly in place when mounted to a hoof. The heel support portions may each contact an inside, a rear side and an outside of each respective hoof heel which enables the hoof shoe to be more reliantly fixated to the hoof.

Besides the curving radius in the plane of the inner side of the bottom rim being different between the two heel support portions the curving or shape of the heel support portions in a plane perpendicular to the bottom rim may also be differ from one heel support portion to the other heel support portion. So as to facilitate a reliantly holding the hoof shoe around the hoof to which it is fitted.

In some implementations the two heel support portions and the front locking portion are configured to only contact the hoof wall of the hoof when the hoof shoe is mounted to a hoof. To this end the shape of the front locking portion and the heel support portions may be configured to contact only the hoof walls of the hoof. For example, the maximum height which the front locking portion and the two heel support portions extends above the bottom rim may be such that the top portion of each of the front locking portion and the two heel support portions, when the hoof shoe is mounted to a hoof, leaves a predetermined separation distance to the upper limits of the hoof walls.

Accordingly, the hoof shoe does not contact any soft tissue of the leg of the hoofed animal and is resiliently held in place by contacting only outer or bottom hoof wall surfaces of the hoof. As opposed hoof boots of prior solutions which are restrained around the lower parts of the hoofed animal's legs, the present fitted hoof shoe does not contact any surface besides the bottom side of the hoof and the hard hoof walls. Accordingly, the present fitted hoof shoe reduces risks of reduced blood circulation and soft tissue chafing. In some implementations when the hoof shoe is in the locked state and mounted on a hoof, the bottom rim and the locking portion forms an opening configured to enable a distal portion of the hoof to extend through the opening. The distal portion of the hoof may be referred to as the hoof toe. With an opening the front locking portion may be easier to lock around the hoof whilst providing for reliantly holding the hoof shoe around the hoof in the locked state. A central opening enables less material to be used for forming the hoof shoe while the resilience of front locking portion is facilitated.

In some implementations the first locking member comprises an extending member comprising a throat and a head, wherein a width of the head is greater than a width of the throat, and wherein the second locking member comprises a slot configured to interlock with the first locking member. With a head portion provided on the first locking member and a corresponding slot provided in the second locking member the hoof shoe may be reliantly mounted to a hoof by inserting the head portion into the corresponding slot. The front locking member may enable a tight fit between the head portion and the slot such that the two locking members do not accidentally become disengaged. In some implementations the corresponding slot is a corresponding groove (which may be referred to as a depression or inversely a corresponding ridge or protrusion) provided on an outside of the front locking portion (i.e. facing the outside of the hoof shoe). The head portion is aligned with the grove during mounting and inserted into the groove. The groove and head portion may be configured such that, in the installed state, the head portion is pressed against the groove to thereby be restrained by friction and not accidently disengage from the groove. In some embodiments an unlocking slot is provided along a portion of the perimeter of the groove to allow a tool (e.g. a flat head screwdriver, bradawl or wedge shape) to be inserted between the groove and the head portion to bring the hoof shoe into the unlocked state.

A head and slot locking mechanism have the benefit of being easy to lock while being reliantly locked together in the locked state. Besides deliberately disengaging the lock the hoof shoe may remain reliantly mounted by such a lock as the force necessary to unlock the locking portion is normal to a front side of the hoof wall. The hoof wall, being rigid, may not accidentally disengage the locking units as it will not exert any such forces on the hoof shoe from the inside. The head and slot locking mechanism may further be configured with a head and slot which is large an easy to operate. For example, the size of head and slot may be maximized on the front locking portion such that a user may mount the hoof shoe simply and e.g. while wearing gloves.

According to a second aspect of the invention there is provided a method for manufacturing a fitted hoof shoe. The method comprising the steps of scanning a hoof of a hoofed animal with a 3D scanning device to obtain a 3D hoof geometry, obtaining a hoof shoe reference 3D model, the hoof shoe reference 3D model describing a hoof shoe with an initial set of size parameters, computing at least one first size parameter based on a difference between the scanned 3D hoof geometry and hoof shoe reference 3D model; computing a fitted hoof shoe 3D model from the hoof shoe reference model and the at least one first size parameter; and manufacturing a fitted hoof shoe according to the fitted hoof shoe 3D model.

The fitted hoof shoe may be a fitted hoof shoe according to any of the above-mentioned implementations related to the first aspect of the invention. The fitted hoof shoe does not necessarily comprise all features of the above-mentioned implementations. For example, the fitted hoof shoe may comprise a bottom rim portion. Additionally, the fitted hoof shoe may comprise two heel support portions and/or a front portion configured to contact a front side of the hoof with a contacting surface facing the inner side of the bottom rim. The fitted hoof shoe may be a molded shoe configured to clasp the hoof, wherein the fitted hoof shoe is provided with at least one slot and/or aperture to allow the fitted hoof shoe to be mounted on the hoof.

In the context of this application, a 3D scanning device is to be interpreted as any device capable of acquiring image or position data that can be directly or indirectly used for describing the 3D form of an object. The image or position data describing the object may be processed by the 3D scanning device, or another device, so as to generate a 3D geometry depicting the object as a solid, a point cloud, mesh of polygons and/or a group of voxels. Alternatively, the image or position data describing the object may conveyed by the 3D scanning device to a remote data processing unit, wherein the remote data processing unit processes the data to generate the 3D geometry. The 3D scanning device may be camera, stereo camera, LIDAR, RADAR or ultrasound scanner. In some implementations, the 3D scanning device is moved around the hoof to enable scanning the entirety of the hoof. The 3D scanning device may scan both the outside of a hoof (and potentially a portion of the lower leg of the hoofed animal) and the underside of the hoof so as to enable generating a 3D model of the entire hoof, optionally including a portion of the hoofed leg.

The 3D hoof shoe reference model is a digital model depicting a reference (fixed size and unfitted) hoof shoe. The 3D hoof shoe reference model may be a CAD drawing and/or represented by a solid, a point cloud, mesh of polygons and/or a group of voxels. The 3D hoof shoe reference model may be described with a plurality of size parameters. For example, the size scale of the entire 3D hoof shoe reference model may be a size parameter and the curving radius of a front portion of the bottom rim may be a size parameter. By comparing the 3D hoof geometry and the 3D hoof shoe reference model a size parameter may be computed such that a 3D hoof shoe with the size parameter fits the hoof better. The computed size parameter may be referred to as a new or updated size parameter which is anew or updated size parameter from the initial set of size parameters describing the hoof shoe 3D reference model. For example, an initial size parameter describing a curving radius with an initial value of 1 cm is updated to 1.4 cm forming a new computed size parameter. In other implementations, the initial size parameter (e.g. the curving radius) is not initially associated with an initial value wherein the computed (new) size parameter is a value which is a first value rather than an updated value. In some implementations, a plurality of size parameters are computed wherein the plurality of size parameters describe a continuous deformation of the reference 3D hoof shoe model into a fitted 3D hoof shoe model which is tailored after the scanned hoof. The fitted 3D hoof shoe model and the reference 3D hoof shoe model being homeomorphic.

By applying the computed size parameter to the 3D hoof shoe reference model a fitted hoof shoe 3D model may be extracted. The fitted 3D hoof shoe model being tailored after the hoof scanned with the 3D scanning device. Lastly, the fitted hoof shoe is manufactured according to the fitted hoof shoe 3D model.

A benefit of the present invention is thus that fitted hoof shoes may be manufactured precisely and with an enhanced fit which provides for hoof shoes which are more reliantly mounted to a hoof and may require less material during manufacturing. In some implementations manufacturing a fitted hoof shoe comprises 3D printing the fitted hoof shoe.

The 3D printing may involve any suitable form of 3D printing or additive manufacturing. For example, 3D printing may involve 3D printing with a plastic material, e.g. polyamide, by feeding a plastic filament through a heated nozzle. Further, it may involve use of additives in the form of fibers, e.g. cellulose fibers (e.g. recycled), textile fibers, Kevlar fibres, etc. Additionally or alternatively, the 3D printing may involve printing in metal, for example by employing powder bed fusion. With 3D printing only the necessary amount of material is used and little or no waste material is generated. An advantage with using 3D printing is that it facilitates controlling material properties in a more flexible manner than by use of traditional production methods (e.g. form casting, forging) implying that the rim portion may be tailored to provide some resiliency vertically, which may be advantageous. In some implementations the size parameter is chosen from a group of size parameters comprising: a curve radius of a bottom rim, a curve radius of a first heel support portion, a curve radius of a second heel support portion, a width of a front locking portion, and a shape of a front locking portion.

Additional size parameters comprises a width of a bottom rim, an inner tilt angle between the first and/or second resilient member the bottom rim portion, a maximum height above the bottom rim for the front portion, a maximum height above the bottom rim for the first and second heel support portions and a size and/or curving radius of the central opening in the bottom rim. As mentioned in the above a plurality of size parameters may describe a continuous deformation of a reference the hoof shoe. In some implementations, a plurality of size parameters describes a continuous deformation of one or more portions of the hoof shoe (such as the front portion and/or the heel support portion) while a set of size parameters describe design parameters of other portions (such as the curving radius of the bottom rim portion). In some implementations computing at least one first size parameter comprises conditioning a neural network trained to predict at least one output variable given at least one conditioning variable, the at least one conditioning variable being based on the scanned 3D hoof geometry; and providing the output variable to an output stage configured to predict the at least one first predicted size parameter.

The at least one conditioning variable may be data describing the shape, point cloud, group of voxels, and polygon mesh from the 3D scanned hoof. For example, the conditioning variables may be each point or each voxel of the 3D scanned hoof. To facilitate computational efficiency and use of simpler/more easily trained neural networks the 3D scanned hoof data maybe down converted to a predefined amount of data. For example, the 3D scanned hoof geometry is down converted to a predetermined number of points in space (each represented by a vector with x, y, and z coordinates) wherein the neural network features an input layer configured to the receive the predetermined number of points (vectors) as input.

To train the neural network a training set of scanned 3D hoofs models may be provided alongside at least one respective (new) size parameter. The (new) size parameters originating from fitted 3D hoof shoe models that for example have been obtained by manually manipulating the reference 3D hoof shoe model to obtain the fitted 3D hoof shoe models for each scanned 3D hoof. As is known practice for training neural networks the internal weights of the neural network are altered such that the output predicted data (the fitted 3D hoof shoe model) resembles the true output data (the e.g. manually designed fitted 3D hoof shoe model) for each input in the training data set.

The neural network may be any suitable type of neural network including recurrent neural networks, deep neural networks and convolutional neural networks.

BRIEF DESCRIPTION OF THE DRAWINGS

These and other aspects of the present invention will now be described in more detail, with reference to the appended drawings showing exemplary embodiments of the present invention, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1A:
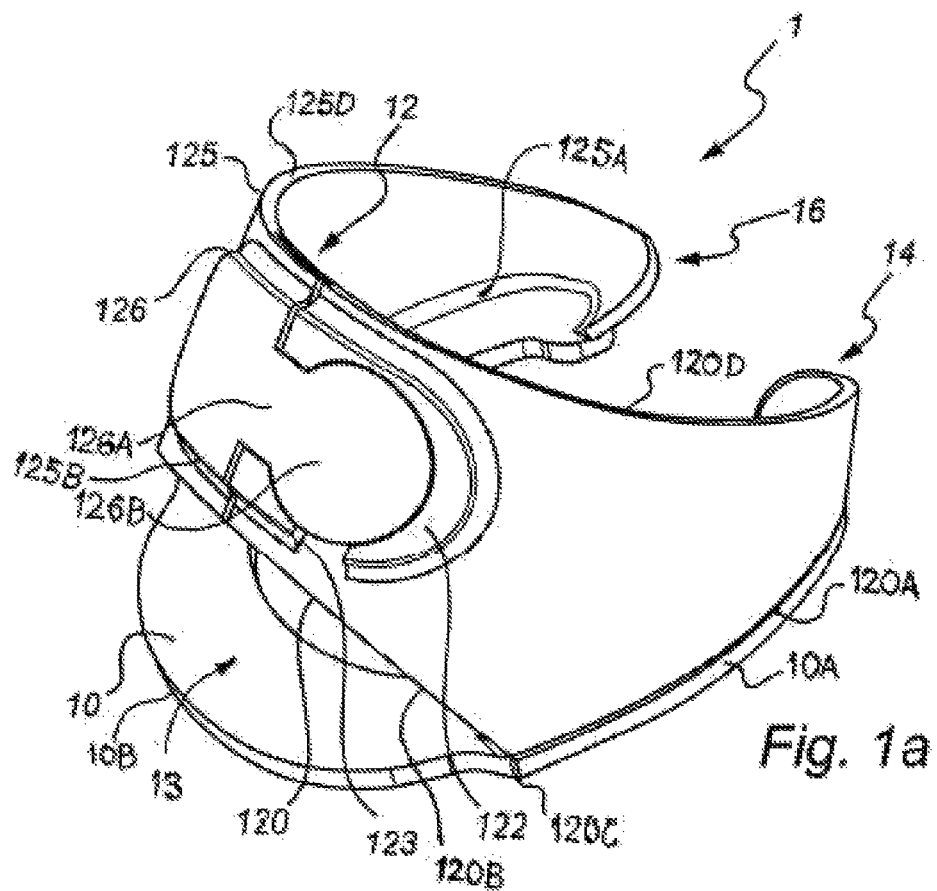
FIG. 1a depicts a perspective view of a hoof shoe according to some implementations.

FIG. 1a depicts a hoof shoe 1 according to some embodiments of the present invention. The hoof shoe comprises a bottom rim portion 10, a form locking front locking portion 12 and two heel support portions 14, 16. The front locking portion 12 comprises two resilient members 120, 125 which are joined with the bottom rim portion 10 on a respective half portion of the bottom rim portion 10. The resilient members 120, 125 and the heel support portions 14, 16 each form an outer wall extending from the bottom rim 10 with a respective hoof contacting face oriented towards the inside of the hoof shoe.

As shown, a substantially horizontally extending lower edge 120A, 125A of each resilient member 120, 125 is fixedly attached adjacent the outer side edge 10A of said first and half portion, respectively, along a major portion of the horizontal extension of said first and half portion, respectively, and wherein preferably each resilient member 120, 125 having a generally vertically extending front edge 120B, 125B connecting with a front end 120C, 125C of each of said lower edge 120A, 125A of said resilient members 120, 125 at a position providing an open central toe opening 13, without any obstructing parts extending vertically within said central toe opening 13, i.e. between a front part 10B of said bottom rim portion 10 and said resilient members 120, 125.

Preferably said horizontally extending lower edge 120A, 125A of each resilient member 120, 125 is fixedly connected to each of said heel support portions 14, 16, such that said resilient members 120, 125 are integrated with said heel support portions 14, 16 to extend forward from said heel support portions 14, 16.

Further, as shown the vertical extension of each of said resilient member 120, 125 is such that it increases from a rear portion thereof to a front portion thereof. Hence the vertical distance between the lower edge 120A, 125A and an upper edge 120D, 125D of each resilient member 120, 125 is larger adjacent the front edge 120B, 125B than at a rear portion of each resilient member 120, 125.

In some implementations, the two heel support portions 14, 16 are only indirectly coupled to the resilient members 120, 125 via the bottom rim 10 (not shown). In other implementations, the resilient members 120, 125 extend backwards, along the bottom rim 10 so as to be directly joined also with a respective heel support portion 14, 16. While the resilient members 120, 125 are resilient so as to allow the locking portion to be locked and unlocked the resilient members 120, 125 and other portions of the hoof shoe 1 may be self-supporting and rigid so as to maintain the same shape in both the locked/unlocked states and the mounted/unmounted states.

The front locking portion 12 comprises a first and second locking member 122, 126 that are form locking. Accordingly, front locking portion 12 includes a female locking member 122 and male locking member 126. As shown in the figures in one embodiment male locking member 126 is attached onto the first resilient member 125, including a protruding throat 126A and head 126B, configured to fit tightly into a corresponding female recess 122A provided in the female locking member 122, which is attached onto the second resilient member 120 to form a locking function between the resilient members 120, 125. To facilitate unlocking the resilient members 120, 125, the female locking member 122 may comprise a slit 123 for enabling a tool or a finger of a user to push the head portion 126B of the male locking member 126 out from the female locking member 122.

Preferably at least at one interfitting position between said locking members 122, 126 there is arranged an additional locking device 127, as will be explained in more detail in connection with FIG. 2A.

Figure 1B:
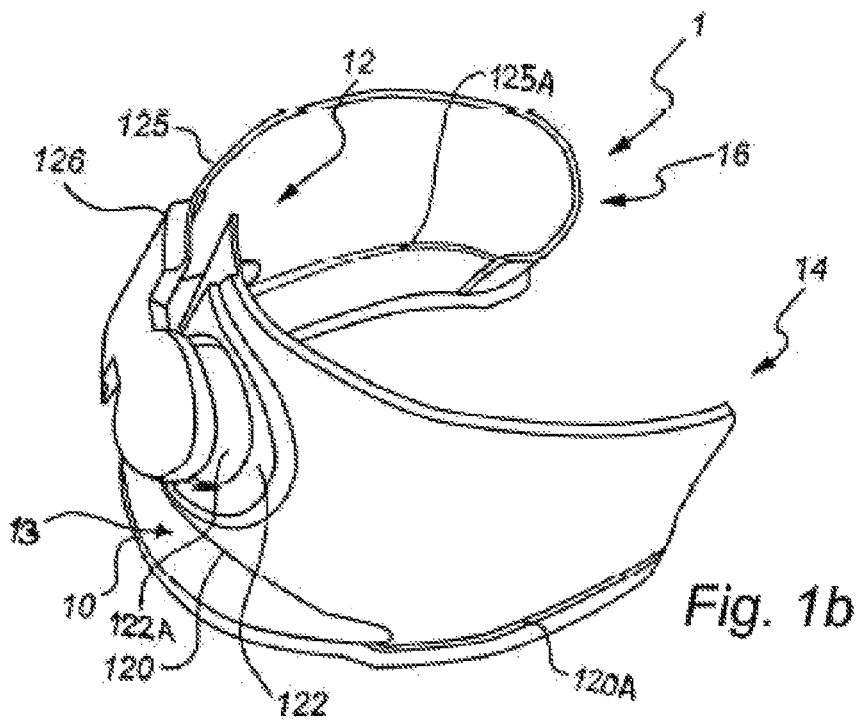
FIG. 1b depicts a perspective view of a hoof shoe in the open state according to some implementations.

FIG. 1*b* depicts a fitted hoof shoe in the open state. The extending portion 126 has been brought out of engagement with the corresponding slot 122. A respective end of the resilient members 120, 125 are thereby not indirect mechanical contact with each other and may be bent aside so as to increase an inner width of the hoof shoe 1 and enable a hoof to be easily inserted. In the open state, the fitted hoof shoe 1 may still be rigid and maintain its shape. Primarily the resilient members 120, 125 may be thin so as to allow some flexibility in at least the front locking portion 12. The heel support portions 14, 16, a potential side portion and/or the bottom rim portion 10 may be further be rigid while flexible so as to allow a user to exert a bending, shearing or torsion force on the hoof shoe which is flexes while being mounted onto a hoof. In some implementations the bottom rim is rigid and not flexible (for example made out of metal or a thick plastic material) while the resilient members 120, 125 of the front locking portion 12, potential side portions and the heel support portions 14, 16 are flexible (for example made out of a thin plastic material).

Figure 2:
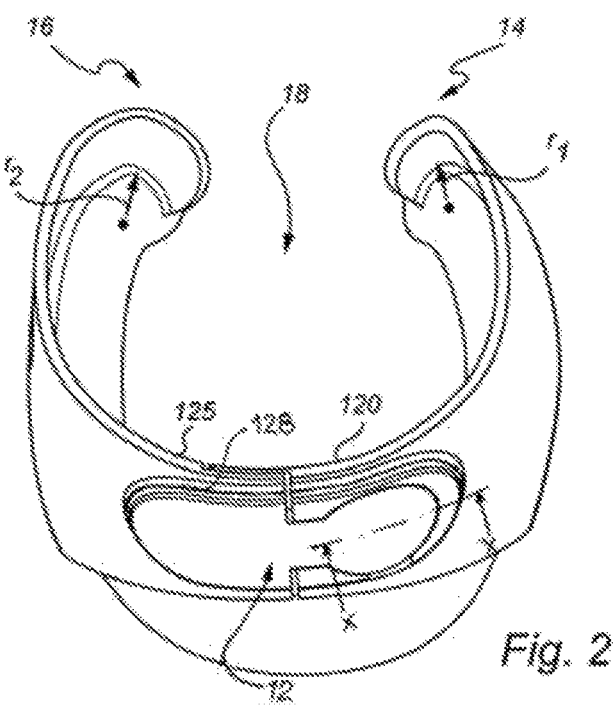
FIG. 2 depicts a top view of a fitted hoof shoe according to some implementations.

FIG. 2 depicts a top view of the hoof shoe. The bottom rim 10 portion partly surrounds a central opening 18 with the heel support portions 14, 16 delimiting a respective rear end of the bottom rim 10. To enable a hoof shoe with facilitated mounting function the inner curving radius $r_1$, $r_2$ for the heel support portions 14, 16 (defined in the plane of the inner surface of the bottom rim) may be different from each other and/or adapted after particular hoof to which the hoof shoe is fitted. For example, depending on a current state of the heels of the hoof the heel support portions 14, 16 may feature a corresponding curving radius to facilitate a better fit. Moreover, the angle at which the heel support portion 14, 16 extends upwards from the bottom rim may be different. For example, the first heel support portion 14 may form an approximately right angle with the inner side plane of the bottom rim while the second heel support portion may form an acute (e.g. 50 degree) or obtuse angle (e.g. 120 degrees) with the inner side plane of the bottom rim. Further, the heel support portions may feature a respective curving radius to an imaginary point in space above the bottom rim so as to be concave in both the plane of the inner side of the bottom rim and in a plane perpendicular to the plane of the inners side of the bottom rim.

When the hoof shoe is mounted to a hoof and the front locking portion 12 is locked around the hoof, the hoof shoe is restrained between the first and second resilient members 120, 125 and the heel support portions 14, 16.

Figure 2A:
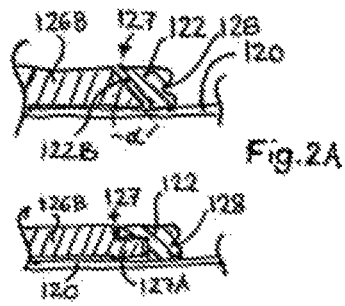
FIG. 2A shows examples of designs of an additional locking device, by presenting partly cross-sectional views along line X-X in FIG. 2.

In FIG. 2A there are shown some examples of designs of additional locking device 127, by presenting partly cross-sectional views along line X-X in FIG. 2.

In a first embodiment shown at the top of FIG. 2A the additional locking device 127 may be in the form of arranging one or a plurality of interfitting edge surface/s at the remote end of the locking head 1268 and the facing surfaces 1228 of the female locking member 122 having an acute angle α, e.g. 10-70°. At the other end of the head and recess, respectively, the corresponding angle preferably is 0°, or close to 0° to enable easy slide-in interfit, or alternatively a slight snap-in fit.

In a second embodiment shown at the bottom of FIG. 2A the additional locking device 127 may be in the form of arranging one tooth or a plurality of teeth 127A protruding from a lower part of the edge surface at the remote end of the locking head 1268 and the facing part 122C of the female locking member 122 having a corresponding recess. At the other end of the head 128 and recess 122A, respectively, the corresponding angle preferably is 0°, or close to 0° to enable easy slide-in fit, or alternatively a slight snap-in fit. Alternatively said additional locking device 127 may be in form of on pair of interfitting parts, or more, similar to lego pieces.

Further, as indicated in FIGS. 2 and 2A the additional locking device 127 may be in the form of a lid (not shown) having a rim with snap in members that are arranged to snap-in in a groove 128 formed around body of the front locking member.

Moreover, the said additional locking device 127 may be in the form of Velcro pads (not shown), e.g. one arranged centrally within the recess 122A and one arranged on the facing side of the locking head 128.

Figure 3:
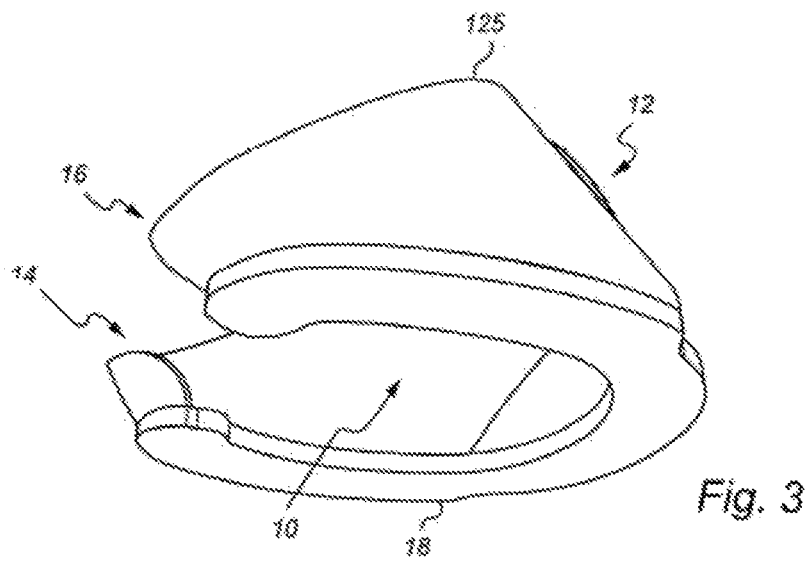
FIG. 3 depicts a bottom perspective view of a fitted hoof shoe according to some implementations.

FIG. 3 depicts a bottom view of the hoof shoe. The two heel support portions 14, 16 are separated from each other by the central opening 18 provided in the bottom rim 10. The second resilient member 125 of the front locking portion 12 may be joined with the bottom rim 10 so as to form an outerwall which extends backwards to the second heel support portion 16. The resilient member 125 may thus form a side portion extending between the second heel support portion 16 and the frontmost point of contact between the front locking portion 12. The side portion may be a solid wall as depicted or alternatively provided with one or more openings e.g. allowing a side portion of the hoof to extend slightly beyond the reaches of the bottom rim 10. Equivalently, the first resilient member may also comprise a respective side portion which is solid or provided with one or more apertures.

Figure 4:
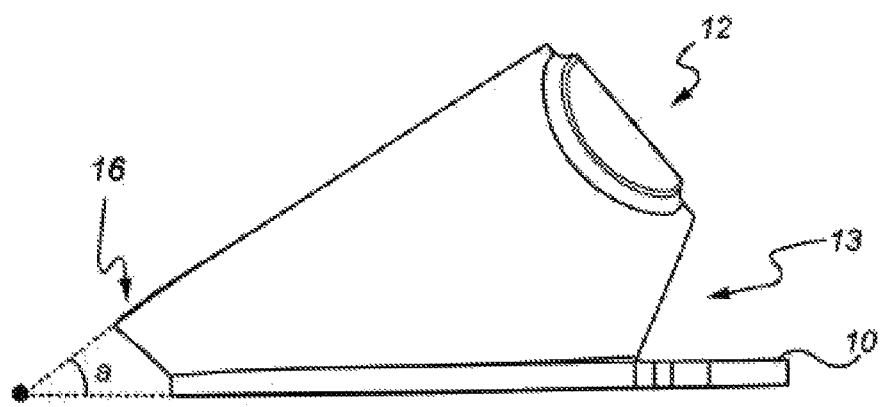
FIG. 4 depicts a side view (right) of a hoof shoe according to some implementations.

FIG. 4 depicts a side view of a hoof shoe according to embodiments of the present invention. In the locked state (as depicted in FIG. 4) the front locking portion and the bottom rim 10 may be configured to form an opening 13 so as to enable a distal portion of the hoof (which may be referred to as the toe of the hoof) to extend through the opening 13 when the hoof shoe is mounted to the hoof. The opening 13 forms and inverse hoof shoe clip. The point along the bottom rim where the resilient members of the front locking portion 12 are attached contacts the hoof in a manner equivalent to a side clipped hoof shoe.

Further depicted in FIG. 4 is the rising angle a which may define the maximum height of the respective heel support portions 16 and the front locking portion as a function of the distance from the rear end of the bottom rim 10. The rising angle a may be a size parameter. For example, the rising angle a may preferably be equal to or smaller than a rear to front rising angle (e.g. the hairline angle) of the hoof to which the hoof shoe is fitted. Accordingly, the heel support portion and the front locking portion contacts hoof walls of the hoof and does not contact any soft tissue of the leg of the hoofed animal. Moreover, the angle at which the hoof contacting surface of the front locking portion 12 rises may be fitted after the hoof to which the hoof shoe is to be fitted. For example, the angle which an imaginary extension of the inner contacting surface of the front locking portion 12 forms with the inner surface plane of the bottom rim may be a size parameter which is fitted after the front to back rising angle (e.g. the hoof toe angle which is measured by a hoof gauge) of the hoof to which the hoof shoe is fitted.

Figure 5:
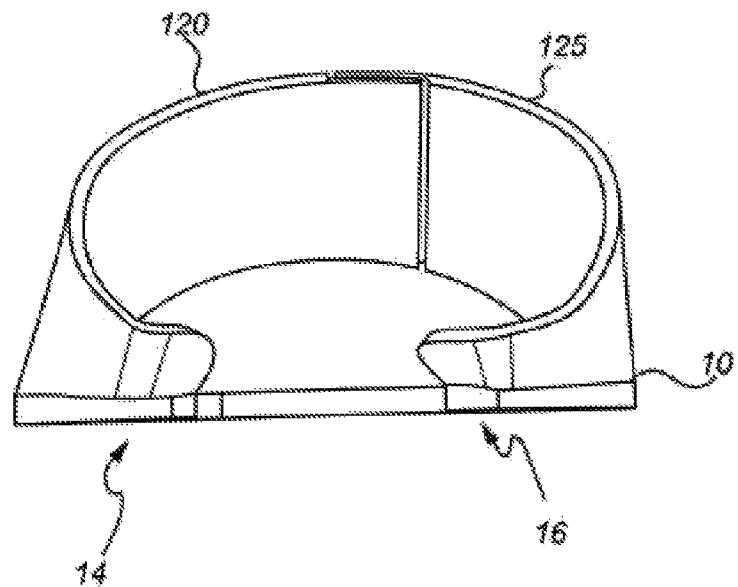
FIG. 5 depicts a back view of a hoof shoe according to some implementations.

With reference to FIG. 5 there is depicted a rear view of a hoof shoe according to some embodiments of the present invention. The hoof contacting surfaces of the first and second resilient member 120, 125 forming the front locking portion are visible. The back to front rising angle of the hoof shoe is visible with the height of the heel support portions 14, 16 (relative the bottom rim 10) increasing via the optional side portions to the maximum height of the front locking portion. Collectively, each part (heel support portion 14, 16, resilient member 120, 125 and optional side portions) which joins the bottom rim forms a part of a total outer wall which is attached to the bottom rim 10. To fit the hoof shoe to a hoof the angle at which the total outer wall extends from the bottom rim may be described by one or size parameters. As depicted in FIG. 5 the left resilient member and side portion extends from the bottom rim at a smaller angle compared to the right side portion and resilient member which extends at a larger angle. To describe the hoof shoe a plurality of size parameters may each represent a respective angle between the outer wall and the bottom rim portion 10 at a predetermined spacing around the bottom rim.

Figure 6:
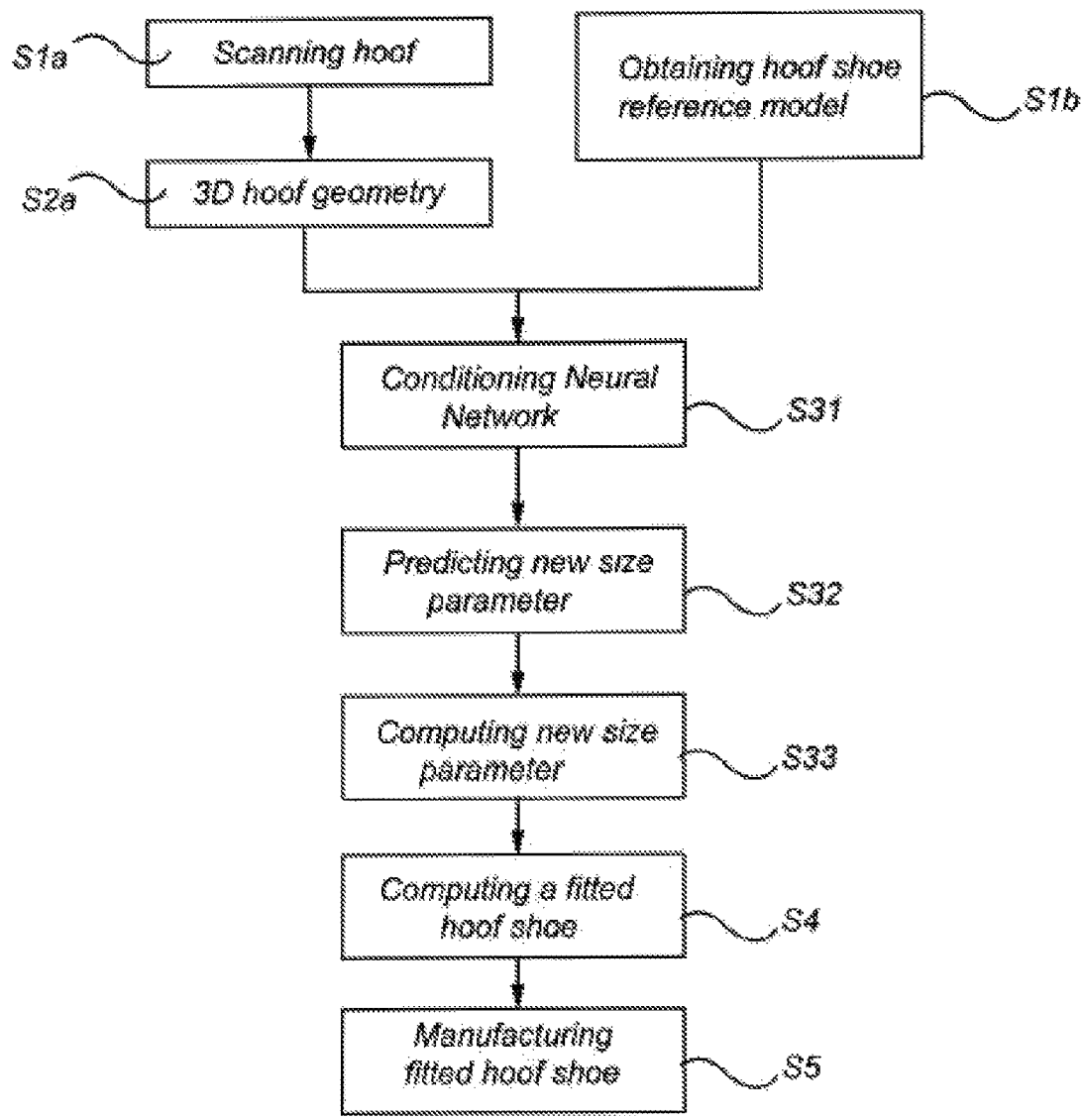
FIG. 6 is a flow chart describing a method according to some implementations of the second aspect of the invention.

FIG. 6 illustrates a flow chart which describes a method according to embodiments of the present invention. At S1*a* a hoof is scanned using a 3D scanning device. For example, a user scans the hoof using the camera of a smartphone. Either the 3D scanning device outputs a 3D hoof geometry representing the shape of the scanned hoof at S2*a* or the 3D scanning device conveys 3D scanning data to a remote processing unit which generates a 3D hoof geometry model at S2*a*. At S1*b* a reference 3D hoof shoe model is obtained. The reference 3D hoof shoe model being described with at least one reference size parameter. At S33 a (new) size parameter is computed by comparing the scanned 15 3D hoof geometry with the reference 3D hoof shoe model. Optionally, at least one conditioning variable representing the scanned 3D hoof geometry is provided as conditioning data to a neural network trained to predict at least one output variable at S31. The output variable is provided to an output stage configured to provide at least one predicted size parameter S32. The predicted size parameter may then be the computed size parameter of S33. In some implementations, the neural network receives a conditioning variable representing the scanned 3D hoof geometry and an indication of the type of hoof shoe. Consequently, the neural network may be trained to predict at least one size parameter depending on the type of reference 3D hoof shoe model. In some implementations, the neural network is trained to predict size parameters for a fitted hoof shoe 3D model of a particular type provided only conditioning information representing the scanned 3D hoof.

Additionally or alternatively, step S33 may comprise applying continuous deformation of the reference 3D hoof shoe model such to obtain a fitted 3D hoof shoe model around the scanned 3D hoof geometry. The resulting fitted 3D hoof shoe model may be described with at least one size parameter. At S4 a fitted hoof shoe model is computed from the at least one size parameter. The fitted hoof shoe model may be represented by a 3D CAD schematic, a point cloud, a 3D solid or a mesh of polygons. The fitted hoof shoe is manufactured at S5, e.g. using additive manufacturing. The manufactured fitted hoof being adapted to fit the scanned hoof.

In some implementations, it is only step S1*a* and optionally S2*a* that are performed by a user with a user device acting as the 3D scanning device. A user may also indicate a hoof shoe reference model and convey the indication alongside the data representing the scanned hoof to a manufacturing entity, e.g. an additive manufacturing or 3D printing facility. The user may further indicate a desired material in which the hoof shoe should be manufactured, a color of the hoof shoe, any desired markings to beaded to the hoof shoe (e.g. a line of text of a symbol) and/or a type of studs to be added to an underside of the bottom rim. At the manufacturing facility, a fitted 3D hoof shoe model is extracted from the scanned hoof data and manufactured in accordance with the properties specified by the user. The manufactured fitted hoof shoe is shipped back to the user which mounts the hoof shoe to the hoof of the hoofed animal.

The skilled person in the art realizes that the present invention by no means is limited to the embodiments described above. The features of the described embodiments may be combined in different ways, and many modifications and variations are possible within the scope of the appended claims. For example, the reference 3D hoof shoe model and the resulting fitted 3D hoof shoe model may comprise a front portion wherein the resilient members are permanently fixated to each other, and the hoof shoe does not comprise any individual heel support portions. Further, a possible modification is based on providing a groove (not shown) in the bottom portion of the rim portion 10 wherein said groove is intended for receiving an exchangeable hoof shoe part (which may be prefabricated in different materials/combinations providing a variety of different properties), such that an even extended flexibility is obtained regarding choice of hoof shoe properties. Moreover it is foreseen that a hoof shoe according to the invention may be fitted with sensors that may measure forces between the hoof and the hoof shoe, which may assist in identifying injuries at an early stage, e.g. by identifying changes in the pattern of movement of a horse. Preferably, thin plate like formable sensors are used, e.g. by use of printing technology, preferably based on sensing pressure. Additionally, a housing may be arranged for, e.g. in the body of the locking portion 12, to hold a memory card. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A fitted hoof shoe for hoofed animals, said hoof shoe comprising:
   a bottom rim portion configured to, on an inner side thereof, contact a bottom side of a hoof, the bottom rim portion comprising a first and a second half portion joined at a common front end and partly enclosing acentral opening, two heel support portions, each heel support portion extending from an outer side of a respective rear end of the bottom rim portion and wherein said two heel portions are configured to contact a rear side of a hoof when the hoof shoe is mounted to a hoof, and
   a front locking portion, the front locking portion comprising:
      a first and second locking member, and
      a first and a second resilient member, wherein the first locking member is attached to an outer side of the first half portion of the bottom rim portion via said first resilient member and the second locking member is attached to an outer side of the second half portion of the bottom rim portion via said second resilient member, wherein the first and second locking members are configured to mate in a locked state around a hoof and the front locking portion is configured to contact a front side of the hoof with a contacting surface facing the inner side of the bottom rim portion, wherein a substantially horizontally extending lower edge of each resilient member is fixedly attached adjacent the outer side edge of said first and second half portion, respectively, along a major portion of the horizontal extension of said first and second half portion, respectively, and wherein each resilient member having a generally vertically extending front edge connecting with a front end of each of said lower edge of said resilient members at a position providing an open central toe opening between a front part of said bottom rim portion and said resilient members.

2. The hoof shoe according to claim 1, wherein the inner side of the bottom rim portion and the contacting face of the front locking portion defines an inside of the hoof shoe, and wherein an inside facing side of the two separate heel support portions are concave so as to clasp a respective heel buttress of the hoof, wherein preferably said horizontally extending lower edge of each resilient member is fixedly connected to each one of said heel support portions, such that said resilient members are integrated with said heel support portions to extend forward from said heel support portions.

3. The hoof shoe according to claim 2, wherein the two concave heel support portions have a respective curving radius in a plane of the bottom rim portion and wherein the curving radius of the two concave heel support portions are different.

4. The hoof shoe according to claim 1, wherein the two heel support portions and the front locking portion are configured to only contact the hoof wall of the hoof when the hoof shoe is mounted to a hoof.

5. The hoof shoe according to claim 1, wherein said first and second locking member are form locking, including a female locking member and male locking member, wherein at least at one interfitting position between said locking member there is arranged an additional locking device.

6. A fitted hoof shoe for hoofed animals, said hoof shoe comprising:
    a bottom rim portion configured to, on an inner side thereof, contact a bottom side of a hoof, the bottom rim portion comprising a first and a second half portion joined at a common front end and partly enclosing acentral opening, two heel support portions, each heel support portion extending from an outer side of a respective rear end of the bottom rim portion and wherein said two heel portions are configured to contact a rear side of a hoof when the hoof shoe is mounted to a hoof, and
    a front locking portion, the front locking portion comprising:
        a first and second locking member, and
    a first and a second resilient member, wherein the first locking member is attached to an outer side of the first half portion of the bottom rim portion via said first resilient member and the second locking member is attached to an outer side of the second half portion of the bottom rim portion via said second resilient member, wherein the first and second locking members are configured to mate in a locked state around a hoof and the front locking portion is configured to contact a front side of the hoof with a contacting surface facing the inner side of the bottom rim portion, wherein a substantially horizontally extending lower edge of each resilient member is fixedly attached adjacent the outer side edge of said first and second half portion, respectively, along a major portion of the horizontal extension of said first and second half portion, respectively, wherein said first locking member comprises an extending member comprising a throat and a head, wherein a width of the head is greater than a width of the throat, and wherein said second locking member comprises a slot configured to interlock with said first locking member.

7. The hoof shoe according to claim 1, wherein the vertical extension of each of said resilient member is such that it increases from a rear portion thereof to a front portion thereof, wherein the vertical distance between the lower edge and an upper edge of each resilient member is larger adjacent the front edge than at a rear portion of each resilient member.

8. A method for manufacturing a fitted hoof shoe according to claim 1 comprising the steps of:
    scanning a hoof of a hoofed animal with a scanning device to obtain a 3D hoof geometry;
    obtaining a hoof shoe reference 3D model, the hoof shoereference 3D model describing a hoof shoe with an initial set of size parameters;
    computing at least one size parameter based on a difference between the scanned 3D hoof geometry and the hoof shoe reference 3Dmodel;
    computing a fitted hoof shoe 3D model from said hoof shoereference model and said at least one size parameter; and
    manufacturing a fitted hoof shoe of claim 1 from the fitted hoofshoe3D model.

9. The method according to claim 8, wherein manufacturing a fitted hoof shoe comprises 3D printing the fitted hoof shoe.

10. The method according to claim 8, wherein said at least one size parameter is chosen from a group of size parameters comprising:
    a curve radius of a bottom rim,
    a curve radius of a first heel support portion,
    a curve radius of a second heel support portion,
    a width of a front locking portion,
    a shape of a front locking portion, and
    a continuous deformation function of the hoof shoe.

11. The method according to claim 8, wherein computing said at least one first size parameter comprises:
    conditioning a neural network trained to predict at least one output variable given at least one conditioning variable, the at least one conditioning variable being based on said scanned 3D hoof geometry; and providing said output variable to an output stage configured to predict said at least one first predicted size parameter.

\* \* \* \* \*